Figure 1:
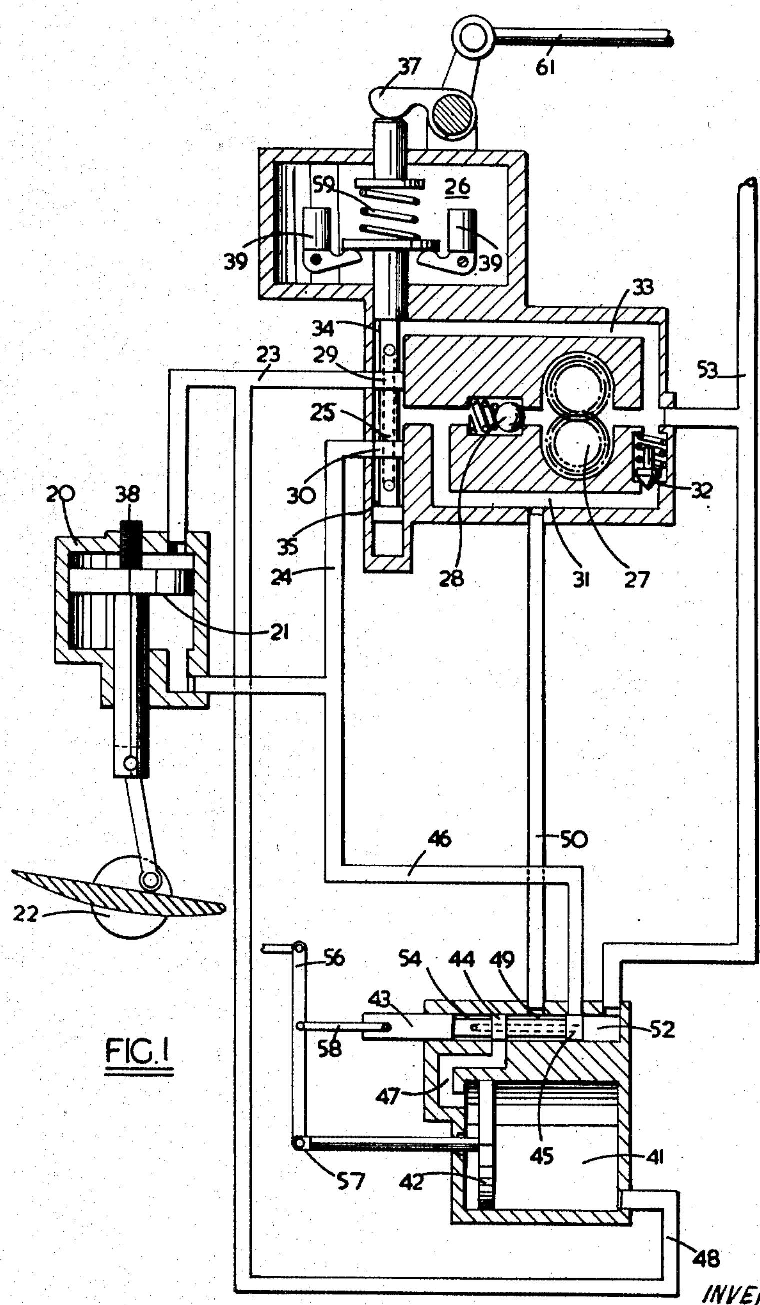

Jan. 11, 1955 B. H. SLATTER ET AL 2,699,219

CONTROL OF GAS-TURBINE ENGINE DRIVEN PROPELLER FOR AIRCRAFT

Filed June 8, 1951 6 Sheets-Sheet 1

INVENTORS
B. H. SLATTER +
T. G. DAISH +
E. G. CASWELL
By Mawhinney + Mawhinney
ATTYS.

INVENTORS
B. H. SLATTER +
T. G. DAISH +
E. G. CASWELL
By Mawhinney + Mawhinney
ATTYS.

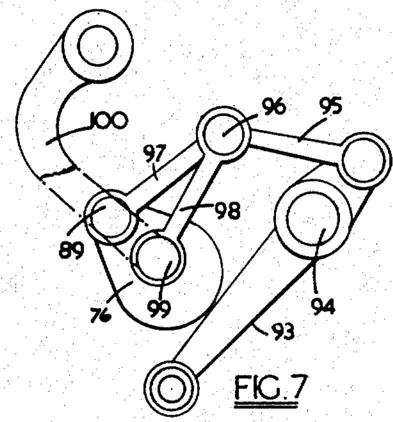
FIG. 7
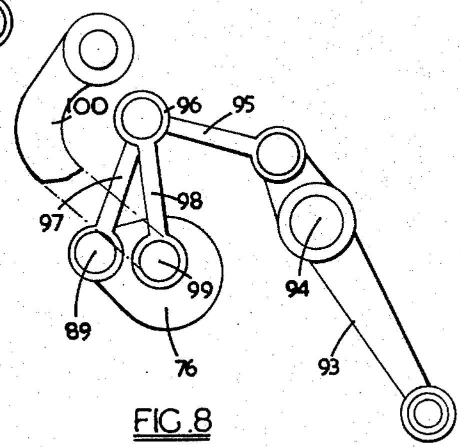
FIG. 8
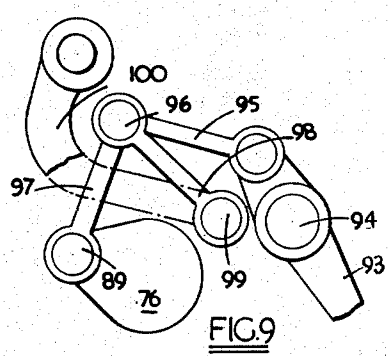
FIG. 9
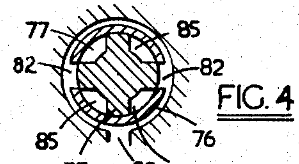
FIG. 4
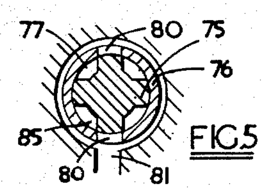
FIG. 5
FIG. 3
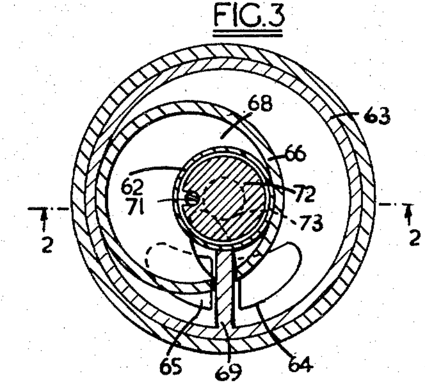
INVENTORS
B. H. SLATTER +
T. G. DAISH +
E. G. CASWELL
By Mawhinney + Mawhinney
ATTYS.

INVENTORS
B. H. SLATTER +
T. G. DAISH +
E. G. CASWELL
By Mawhinney + Mawhinney
ATTYS.

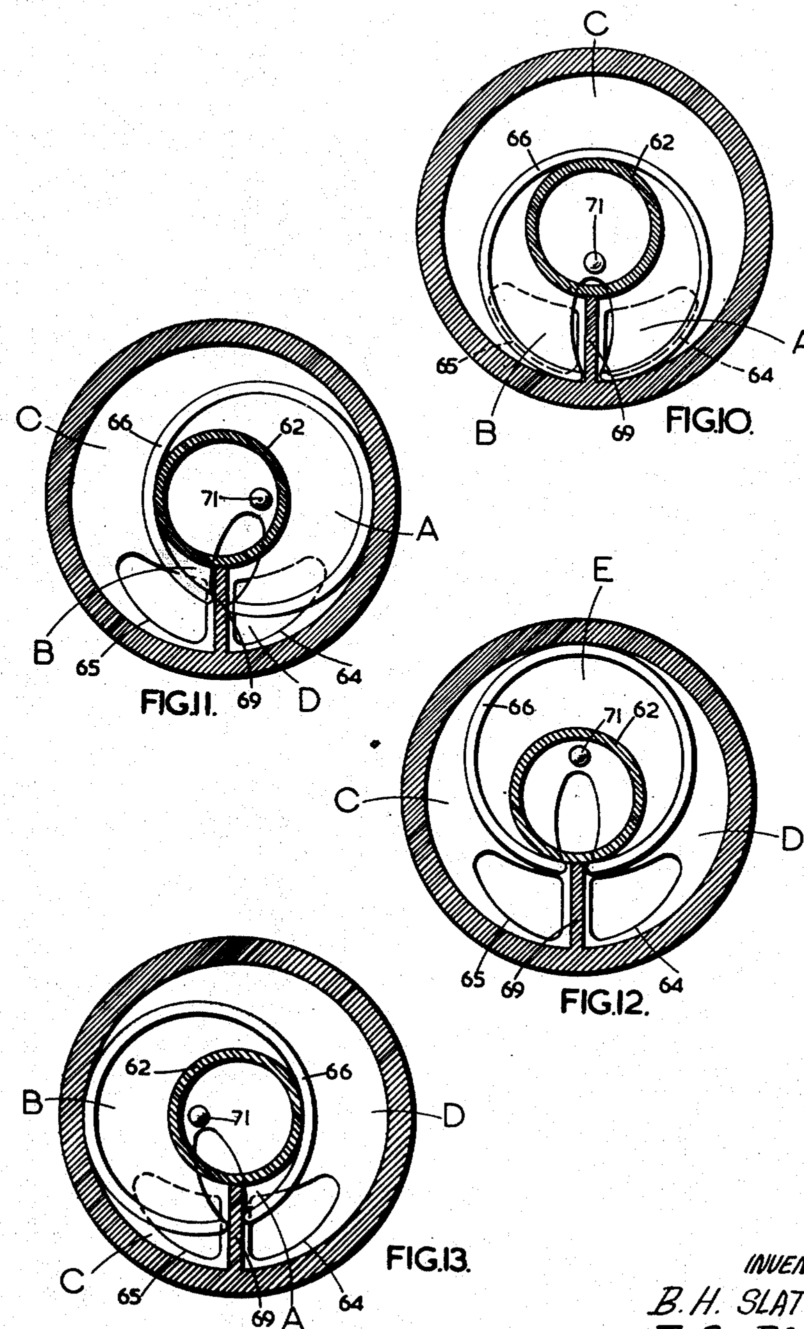
INVENTORS
B. H. SLATTER &
T. G. DAISH &
E. G. CASWELL
BY Mawhinney & Mawhinney
ATTORNEYS INVENTORS
B. H. SLATTER &
T. G. DAISH &
E. G. CASWELL
BY Mawhinney & Mawhinney
ATTORNEYS United States Patent Office 2,699,219

Patented Jan. 11, 1955

2,699,219

CONTROL OF GAS-TURBINE ENGINE DRIVEN PROPELLER FOR AIRCRAFT

Brian H. Slatter, Thomas G. Daish, and Edwin G. Caswell, Coventry, England, assignors to Armstrong Siddeley Motors Limited, Coventry, England Application June 8, 1951, Serial No. 230,474

Claims priority, application Great Britain July 7, 1950

3 Claims. (Cl. 170—135.74)

This invention relates to a propeller-driving gas-turbine engine for an aircraft.

It is well known that the control of such an engine, to render the aircraft capable of taking off from or landing within a confined area (for example, the deck of an aircraft carrier), presents difficulties which make the normal system of control unsuitable for the purpose.

By "normal system of control" is meant one in which the pilot's control (hereinafter referred to as the throttle) is connected both with a fuel control unit and with a governor-controlled pitch-changing mechanism whereby movement of the throttle produces changes in the engine speed and power, and changes in the propeller pitch to absorb the power output in accordance with the new engine speed as determined by the governor setting of the pitch-changing mechanism. In changing from one speed and power to another, there is a time-lag between the movement of the throttle and the settling down of the engine to the newly-selected speed, and during this period an appreciable portion of the power being developed by the engine is expended in overcoming the inertia of the rotor system (either during acceleration or deceleration of the engine), in consequence of which only part of the power is initially available at the propeller. In some cases, however, it is essential (particularly during a deck landing) that the maximum or minimum power should be available at the propeller substantially instantaneously on the selection by the pilot of these requirements.

It is the main object of the invention to provide effective means for doing this while also enabling the engine to operate at constant speed over its normal operating power range—i. e., from "minimum power" to "maximum power." Below "minimum power" the engine can, of course, idle at a lower speed, and above "maximum power," the engine can be speeded up slightly for take-off or other purposes.

A further object of the invention is to provide for different ranges of propeller pitch change which are dependent upon the indicated air speed of the aircraft.

According to the invention, the engine is arranged to run at constant speed over its normal operating power range, and movement of the throttle actuates means which act directly on the pitch-changing mechanism, in conjunction with the governor-controlled means, in such a manner that the propeller will simultaneously absorb the power being developed by the engine resulting from the variation of the fuel flow.

Figure 2:
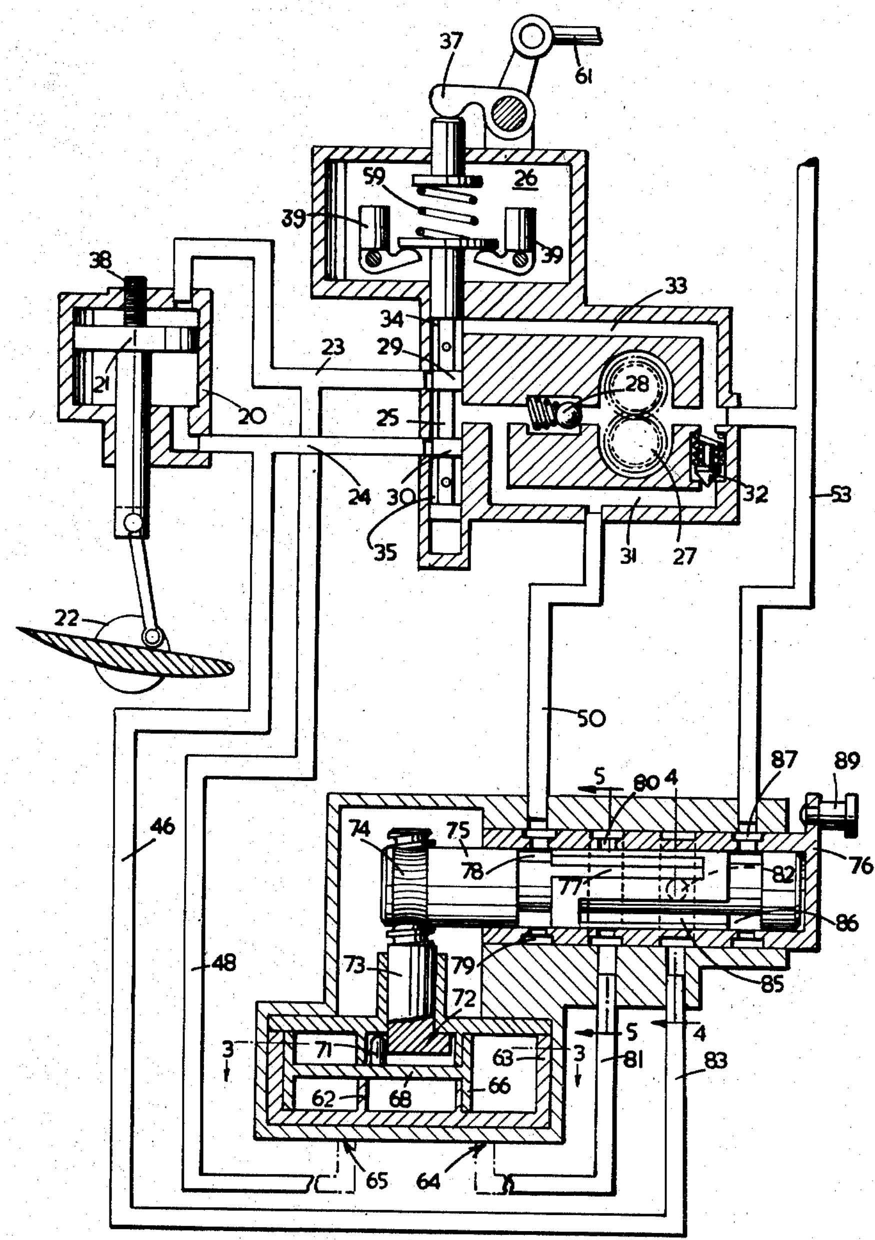
Figure 6:
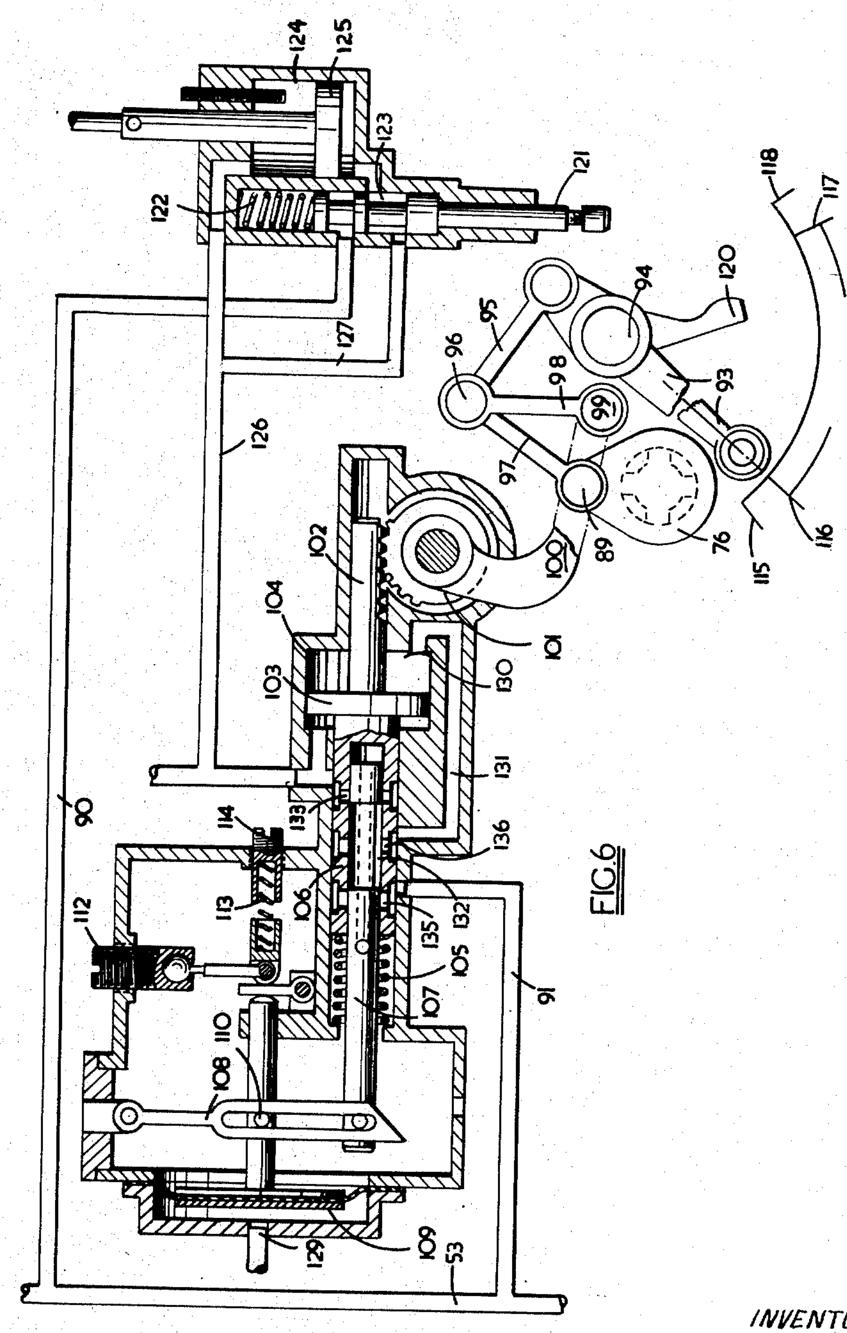

In the accompanying diagrammatic drawings:

Figure 1 shows, for purposes of illustration, a simple method for giving effect to the invention, but there are objections to this scheme from a practical point of view;

Figure 2 shows a preferred arrangement, Figures 3, 4 and 5 being sections taken on the lines 3—3, 4—4 and 5—5 of Figure 2;

Figure 6 indicates means to be applied to the arrangement of Figure 2 for providing different ranges of propeller-pitch-change dependent upon the indicated air speed of the aircraft, Figures 7, 8 and 9 being diagrams of the control lever and associated parts for different conditions.

Figure 14:
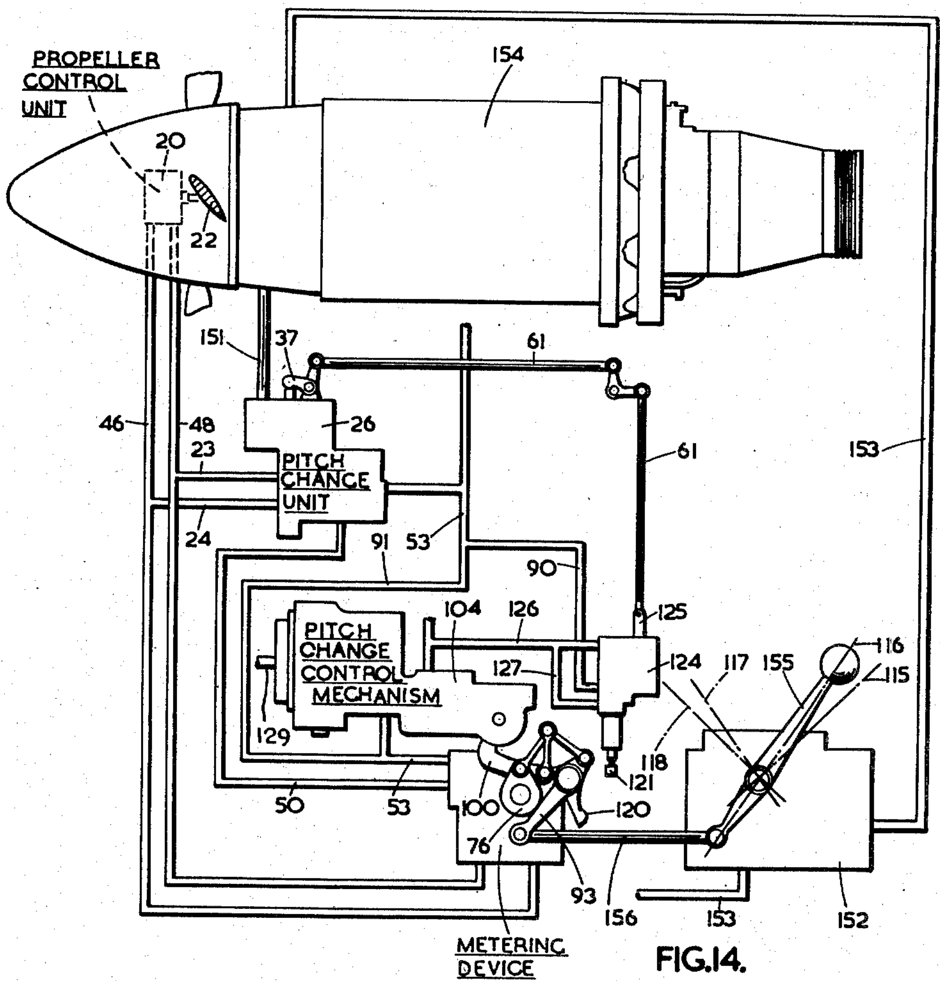

Figures 10 to 13 are diagrams illustrating the functioning of the metering device shown in Figures 2 and 3, and Figure 14 is a diagram showing the relationship of the various elements described with reference to Figures 2 to 13.

Referring now to Figure 1 or 2, this shows a propeller control unit, which is generally similar to a normal form of constant speed unit, having a pitch-changing cylinder 20 with a piston 21 therein connected to the propeller unit 22 in a well understood manner, while the opposite ends of the cylinder communicate, respectively, by coarse and fine pitch passages 23 and 24 with ports, of a pitch change unit, controlled by a valve 25 the position of which is controlled by a governor mechanism 26. The delivery of a booster pump 27 communicates through a non-return valve 28 with the annular passage between the lands 29, 30 on the valve 25, the lands controlling ports to the passages 23 and 24. A by-pass passage 31 interconnects the inlet and delivery sides of the pump and contains a loaded relief valve 32. A further passage 33 connects the inlet of the pump with the annular passage 34 above the top land 29 of the valve 25, for exhaust purposes, while internal passages of the valve connect that annular passage 34 with the annular passage 35 below the lower land 30 of the valve.

The manner in which the said mechanism operates for maintaining the engine speed constant, as long as the governor control lever 37 is not moved, is well-known in practice. Actually, the pitch-changing piston 21 is shown against the fine pitch stop 38 and the governor weights 39 are shown as swung outwardly to the constant speed position, and in these conditions the engine is running at its constant speed and minimum power. The valve 25 occupies the position shown, with the lands 29, 30 blanking the ports for the passages 23, 24, respectively, so that the piston 21 is hydraulically locked against movement.

Referring now only to Figure 1, 41 represents a cylinder with a piston 42 therein, and 43 represents a valve similar in general to the valve 25, the valve 43 having lands 44 and 45. In the position shown the land 45 closes a port for a passage 46 leading to the fine pitch passage 24, and the land 44 closes a port for a passage 47 leading to one end of the cylinder 41. The other end of the cylinder 41 communicates by a passage 48 with the coarse pitch passage 23. The annular space 49 between the lands 44, 45 is in communication with a passage 50 leading to the by-pass passage 31. The space 52 to the right of the land 45 is in communication with the inlet to the pump 27, i. e., with the passage 53 (hereinafter referred to for convenience as the exhaust passage) which receives oil pressure from the main engine pump (not shown). An internal passage in the valve 43 connects the space 52 with the annular space 54 to the left of the land 44.

The throttle (not actually shown) is connected to a lever 56 hinged at 57 to the piston rod of the piston 42 and connected by a link 58 to the valve 43. If the engine is operating within the normal operating power range, with the governor weights 39 in the position shown, movement of the throttle to increase the fuel supply will cause the lever 56 to turn about the pivot 57 as fulcrum, as it will be observed that the piston 42 is hydraulically locked. The valve 43, therefore, moves to the left, thus placing the pressure fluid in the annular space 49 in communication with the passage 47, thereby forcing the piston 42 to the right. Hydraulic fluid is, therefore, delivered by the piston 42 along the passage 48 and the coarse pitch passage 23 to the upper end of the pitch-changing cylinder 20 in order to coarsen the pitch dependently upon the power resulting from the extra fuel being supplied to the engine; it being understood that the quantity of fluid displaced by the piston for a predetermineed throttle movement is substantially the correct amount for coarsening the propeller in accordance with the increasing engine power while maintaining a constant engine speed. The downward movement of the piston 21 exhausts the hydraulic liquid along the passage 46 to the exhaust passage 53 by way of the space 52.

As will be well understood, simultaneously with the movement of the piston 42 to the right the valve 43 is also moved to the right (while the throttle remains in its new position) to close the ports leading to the passages 46, 47 controlled by its lands 45, 44 respectively, thus again hydraulically locking the piston 42, and also the pitch-changing piston 21 in its new pitch position.

During this operation, any departure from constant speed due to inaccuracies in the delivery from the cylinder 41 is taken care of by the governor mechanism 26 acting as a vernier adjustment, i. e., by the weights 39 acting upon the valve 25 in conjunction with the spring 59 in a well understood manner, as previously mentioned, to maintain the constant speed.

Consequently, with this arrangement the extra power resulting from an opening of the throttle is very quickly absorbed by the requisite increase of pitch of the propeller.

When opening the throttle beyond the normal operating power range, as for take-off, the rod 61 is moved (in appropriate conditions, as described hereinafter) to turn the bell crank lever 37 anti-clockwise and thus increase the pressure of the spring 59, whereby the governor mechanism 26 and valve 25 will be set for a higher constant speed. Simultaneously, the piston 42 will be moved further to the right, as previously described, in order (in conjunction with the governor mechanism 26) to coarsen the pitch still further and thereby absorb the extra power developed with a minimum of delay.

In general, the process is reversed when shutting down the throttle.

As stated, however, the directly-acting pitch-changing mechanism (namely, parts 41 to 58) is not a convenient proposition, as it would involve a large displacement of liquid to effect the maximum propeller pitch-change which it would be called upon to produce during a "take-off" after an approach for landing, in consequence of which it assumes inconveniently large proportions. Moreover, it is difficult to calibrate. Therefore, in order to avoid that disadvantage, we prefer to use a known kind of metering device such as is manufactured by George Kent Ltd., of Luton, England, the device incorporating a combined sliding and rolling type of piston which has a relatively small delivery per cycle of the piston. The device can therefore be of relatively small dimensions, the effective delivery of hydraulic fluid to the pitch-changing cylinder 20 being dependent upon the number of cycles of the piston, and this, in turn, is controlled by an appropriate valve device, all as shown by Figure 2.

In Figure 2 the propeller control unit (namely, mainly parts 20 to 39) is the same as that of Figure 1, and connected thereto are the passages 46, 48, 50 and 53 of Figure 1. The metering device comprises an annular chamber between coaxial walls 62, 63, the chamber having ports 64 and 65 in one of its end walls, as shown in Figure 3. In the chamber is a piston having a hollow cylindrical portion 66 adapted to operate, as hereinafter described, with a combined sliding and rolling movement round the wall 63 of the chamber when the latter is supplied with fluid pressure through one of the ports 64, 65, whereby to displace a predetermined quantity of the fluid, for each complete cycle of the piston, through the other port. Between the adjacent ends of the transversely divided cylindrical wall 62 is a disc 68 fast with the cylindrical portion 66 of the piston, and the cylindrical portion 66 and disc 68 are gapped to receive a guiding strut 69 which connects the inner cylindrical wall 62 and the outer wall 63 of the annular chamber between the ports 64 and 65. The piston disc 68 carries a pin 71 pivotally engaged with a disc 72 on the end of a shaft 73. The latter is connected by meas of right-angle gearing, as indicated at 74, giving a material speed reduction, with a valve shaft 75 operating in a control valve sleeve 76.

The valve shaft 75 has two diametrically-opposite, longitudinally-extending recesses 77 in it which communicate at one end with an annular space 78 which is always in communication, by way of an annular space 79 and ports in the control sleeve 76, with the passage 50. When the control sleeve 76 is turned anti-clockwise (Figures 4 and 5) relatively to the valve shaft 75, the recesses 77 are in communication through ports 80 in the control sleeve 76 with a passage 81 leading to the port 64. When the control sleeve is turned clockwise the recesses 77 communicate through ports 82 in the sleeve with a passage 83 to which the passage 46 is connected. In addition, the valve shaft 75 has another pair of diametrically-opposite recesses 85 spaced at 90° from the recesses 77, which communicate with an annular space 86, round the valve shaft, the space 86 at all times communicating, through an annular space 87 and ports in the control sleeve, with the exhaust passage 53. Therefore anti-clockwise (Figures 4 and 5) movement of the control sleeve also interconnects the passage 46 with the exhaust passage 53, by way of ports 82, the recesses 85 and the ports between the annular spaces 86 and 87, and clockwise movement connects the port 64 to the exhaust passage 53. The port 65 is always connected to the passage 48.

The functioning of the metering device is described below with reference to Figures 10 to 13 of the drawings. Figure 10 shows the piston at the commencement of a cyclic movement, and Figures 11, 12 and 13 show the piston successively spaced by 90° therefrom, the cycle being completed when the piston resumes the position shown in Figure 10 from that shown in Figure 13.

In Figure 10, the piston 66 is symmetrical about the strut 69, and its interior is divided by line contact with the wall 62 in two compartments A and B which respectively communicate with the inlet and outlet ports 64 and 65, the fluid outside the piston in space C being static. Pressure acting in compartment A through the inlet port 64 moves the piston counter-clockwise to enlarge compartment A, and, in correspondingly diminishing compartment B, expresses fluid from the latter through the outlet 65. This movement causes the line of contact between the piston and the wall 63 to travel, by a rolling of the piston along the said wall, from adjacent the strut, thus reducing the size of space C (forcing the displaced fluid through the outlet port 65) and forming another external space D which is cyclically behind the said line of contact and which is open to the inlet port 64. This happens during the transition of the piston from the position shown in Figure 10 to that of Figure 11.

Referring now to Figure 11, inlet port 64 is supplying both compartments A and D, and the outlet port 65 is being supplied from both compartments B and C. Further movement of the piston towards the position shown in Figure 12 cuts off the supply to compartment A and also the delivery from compartment B, which latter and compartment A momentarily merge, and disappear as separate entities, when the position shown in Figure 12 is reached.

In Figure 12, the pressure fluid from the inlet port 64 now acts only in compartment D to urge the piston further for expressing more of the fluid from compartment C through the outlet 65. During the momentary merging of the compartments A and B, they form a single space E in which the fluid is static. The pressure in D, however, moves the piston onward to the position shown in Figure 13.

Figure 13 corresponds with Figure 3 and shows compartments A and B reforming (due to the line of contact between the inner wall of the piston and the wall 62 receding counter-clockwise from the strut). This figure also shows compartment A simultaneously opening to the inlet port 64, and the communication to compartment D just beginning to diminish from the maximum as the edge of the piston moves across the inlet port. It also shows the remnant of compartment C expressing the fluid through the outlet 65, and the major proportion of the discharge through the latter being from compartment B; furthermore it shows the proportion of the outlet port 65 which is open to compartment C diminishing, and the proportion open to compartment B increasing as the edge of the piston moves across the outlet port 65.

The subsequent resumption of the position of the piston to that shown in Figure 10 completes one cycle which can be followed by further identical cycles, or by a partial cycle as needed.

It will be observed that throughout the cycle the outer wall of the piston is in line contact with the wall 63 (the line of contact passing through a complete circumference of the latter during the cycle), and that the inner wall of the piston is in line contact with the wall 62—this line of contact also moving completely round the circumference of the wall 62 during one complete cycle. These two lines of contact are always diametrically-opposite one another, and the engagement of the lips of the piston with the strut 69 constrains the piston to partake of a motion which can best be described as a combination of rolling (i. e., on the walls 62 and 63), sliding (i. e., along the strut), and tilting by reason of the conjoint action of the other two movements.

In brief, the operation of this metering device is as follows.

Movement of the throttle in the opening direction effects an anti-clockwise movement of the control sleeve 76 by acting upon an eccentric pin 89 fast with the sleeve, and by this means pressure fluid in the passage 50 is passed to the inlet port 64, thereby moving the piston, in the manner known, for a number of cyclic movements dependent upon the extent to which the relevant ports of the control sleeve have been opened, i. e., dependent upon the angular movement of the control sleeve. The liquid displaced by the piston 66, which is dependent upon the number of cyclic movements of the piston, passes out of the port 65 and along the passage 48 to the coarse pitch passage 23, in consequence of which the pitch is coarsened substantially instantaneously. The operation of the piston 66, however, drives the shaft 73, and thereby the valve shaft 75, so as to close the aforesaid ports, i. e., the valve shaft 75 acts with a follow-up movement in a known manner. The hydraulic fluid expelled by the movement of the piston 21 in the pitch-coarsening direction exhausts along the passage 46 and the appropriate recesses in the valve shaft 75 and ports in the control sleeve 76 into the exhaust passage 53.

As in the case of the construction of Figure 1, any tendency for the engine to run at a speed other than the constant speed, due to inaccuracies in the delivery from the metering device, is taken care of in the usual manner by the governor mechanism 26.

Likewise, opening the throttle beyond the constant speed range, i. e., for take-off, causes the lever 37 to act on the spring 59, whereby to allow the engine to operate at a greater speed.

In a similar manner, movement of the throttle in the closing direction turns the control sleeve 76 in the clockwise direction, thus placing the pressure line 50 in communication with the pressure line 46 by way of the appropriate recesses in the valve shaft 75 and ports in the control sleeve 76, while at the same time the other end of the pitch-changing cylinder 20 exhausts along the passage 48, through the metering device, and through the passage 81 to the exhaust passage 53, by way of the appropriate recesses in the valve shaft 75, and ports in the control sleeve 76. Simultaneously the piston 66 drives the shaft 73 and the valve shaft 75 in the opposite direction to that first described, to provide the necessary follow-up action.

It is well-known, however, that one of the characteristics of a propeller is that a smaller range of pitch change is required, for a given range of throttle movement, at a high indicated air speed than at a lower indicated air speed, and, in consequence, it is desirable for some modification to be introduced into the control of Figures 2 to 5, whereby the range of pitch change afforded by the directly-acting means (mainly the parts 62 to 89) can be varied to suit different indicated air speeds.

Such a pitch change control mechanism is indicated by Figures 6 to 9, Figure 6 showing an arrangement which is to be applied to that of Figure 2, and also showing the operating means for the governor control lever 37. Thus, at the left-hand side of Figure 6 is the exhaust passage 53 which is shown on the right of Figure 2, but in Figure 6 this passage is additionally connected to the passages 90 and 91 to supply them with the engine oil pressure.

The eccentric pin 89 and control sleeve 76 appear in Figure 6, the control sleeve turning, of course, about a fixed axis. 93 represents a control lever operating about a fixed pivot 94 and connected to the throttle. The lever 93 is also linked at 95 to a pivot 96 which is, in turn, linked at 97 to the eccentric pin 89. The pivot 96 is also linked at 98 to a pivot 99 of the lever 100, which is stationary at any predetermined indicated speed.

The lever arm 100 is fast with a toothed quadrant 101 movable about a fixed axis and engaged with rack teeth on a plunger 102 fast with a piston 103 working in a cylinder 104, the plunger being biassed to the right by means of a spring 105. The plunger is also fast with a three-ported sleeve valve 106 with which co-operates a valve 107 having a pin-and-slot connection with a lever 108. A diaphragm 109, positionable responsively to the indicated air speed, also has a pin-and-slot connection at 110 with the lever 108. 112 is an adjuster for the rate of a balance spring 113, and 114 is an adjuster for the load of this spring.

115 represents the idling position of the control lever 93 (i. e., of the throttle), 116 and 117 the "minimum and maximum power" positions, respectively, over the constant speed range, and 118 the emergency or take-off position.

When the throttle is moved to move the control lever 93 beyond the "maximum power" position towards the take-off position, a stem 120 on the control lever 93 (omitted in Figures 7 to 9) engages the end of a plunger valve 121, which is pressed downwardly by a spring 122, thus raising the valve to deliver the engine oil pressure from the passage 90 by way of the annular space 123 to the lower end of the cylinder 124, thus raising the plunger and plunger rod 125 which is mechanically connected to the afore-mentioned rod 61, thereby setting the governor mechanism 26 in a higher rate of speed. The upper end of the cylinder 124 exhausts along the passage-way 126 which is connected to the inlet of the main engine pump (not shown) i. e., to scavenge.

When the throttle is moved to return the control lever 93 to the normal operating power range (between 116 and 117), the spring 122 returns the valve, and the lower end of the cylinder 124 is then connected to scavenge by the passage 127.

During the movement of the throttle, at a given indicated air speed, motion is transferred from the control lever 93 to the eccentric pin 89 by way of the pivot 96 moving arcuately about the centre of the fixed fulcrum 99 (the latter being fixed, as hereinafter described, for any given indicated air speed). Figure 6 shows the control lever 93 and the associated parts at the positions they occupy for "minimum power" at sea level. Figure 9 shows the corresponding parts in the position they occupy at sea level for "maximum power."

At increasing indicated air speeds a connection 129 to a Pitot tube (not shown), disposed so that it is subjected to the high air pressure due to the forward speed of the aircraft, transfers this pressure to one side of the diaphragm 109 the opposite side of which is at atmospheric pressure, so that the pressure difference moves the lever 108 anti-clockwise, thereby moving the valve 107 to the right, and the right-hand end 130 of the cylinder 104 is then connected by the passage 131 and the annular space 132 round the valve 107 with the ports 133, whereby the right-hand end of the cylinder 130 is placed to scavenge, allowing the plunger 102 to move to the right under the action of the spring 105, thus to turn the lever arm 100 clockwise, thereby re-setting the aforesaid fulcrum 99. Figure 7 shows the parts for "minimum power" at maximum indicated air speed, and Figure 8 shows the parts for "maximum power" at maximum indicated air speed.

The movement to the right of the sleeve valve 106 closes the ports 133 with a follow-up action, thus providing an hydraulic lock for the plunger 103, whilst this indicated air speed obtains.

When the air speed decreases, movement to the left of the diaphragm withdraws the valve 107 to the left, thus connecting the pressure in the passage 91 to the passage 131 through the ports 135 and 136 and the annular space 132, whereby the plunger 103 is driven to the left until the follow-up action of the valve sleeve 106 again closes the ports.

It will thus be noted, from a consideration of Figures 6 and 9, that at a predetermined low indicated air speed (e. g., approach speed) the sleeve 76 is turned almost through a right-angle when changing from "minimum" to "maximum" power, or vice versa, and from Figures 7 and 8 it will be seen that, when changing from "minimum" to "maximum" power or vice versa, at maximum indicated air speed, a very much smaller angular movement of the sleeve 76 takes place—i. e., one of only about twenty-five degrees or so, In Figure 14 the various elements described with reference to Figures 2 to 13 are shown in outline and interconnected by the passages hereinbefore referred to, the rod 61 also being shown. This figure also shows a drive shaft 151 from the propeller unit 22 to the governor mechanism 26, and a main throttle control 152 in the fuel supply line 153 of the gas-turbine engine 154, the throttle control lever 155 being connected to the lever 93 by a rod 156.

What we claim as our invention and desire to secure by Letters Patent of the United States is:

1. A throttle-controlled, propeller-driving, gas turbine engine, for an aircraft, including a pitch-change mechanism connected to vary the pitch of a variable pitch propeller, pitch coarsening and fining passages connected with said mechanism, a valve through which operating fluid under pressure can be selectively supplied to said passages, said valve connected to be movable by a governor mechanism for selecting the passage to be supplied, and additional means which is connected to be actuated by the throttle and which selectively supplies fluid under pressure directly to said passages in a position intermediate said mechanism and said valve in such a manner that the propeller will very quickly absorb the change in the power developed by the engine resulting from movement of the throttle while keeping the engine speed at a constant predetermined value, at which latter it is always maintained by said governor mechanism for any setting of the throttle within the normal operating power range of the engine, said additional means including for the purpose a metering device having a cylinder with a sliding and rolling piston therein, a valve with two relatively rotatable parts for selectively controlling the connection of a source of fluid pressure either to one operative end of said cylinder or to said pitch fining passage, a connection between the other operative end of said cylinder and said pitch coarsening passage, a mechanical connection between one of said valve parts and said piston whereby said valve part is rotated by movement of said piston, and a mechanical connection between the other of said valve parts and the throttle whereby movement of the latter will rotate the said other of said valve parts, such that when the throttle-actuated valve part is moved from the neutral position said piston will be operated by the pressure difference applied to it to effect a follow up movement of the piston-connected valve part to return the valve to the neutral position.

2. A throttle-controlled, propeller-driving, gas turbine engine, for an aircraft, including a pitch-change mechanism connected to vary the pitch of a variable pitch propeller, pitch coarsening and fining passages connected with said mechanism, a valve through which operating fluid under pressure can be selectively supplied to said passages, said valve connected to be movable by a governor mechanism for selecting the passage to be supplied, and additional means which is connected to be actuated by the throttle and which selectively supplies fluid under pressure directly to said passages in a position intermediate said mechanism and said valve in such a manner that the propeller will very quickly absorb the change in the power developed by the engine resulting from movement of the throttle while keeping the engine speed at a constant predetermined value, at which latter it is always maintained by said governor mechanism for any setting of the throttle within the normal operating power range of the engine, said additional means including for the purpose a metering device having a cylinder with a sliding and rolling piston therein, a valve with two relatively rotatable parts for selectively controlling the connection of a source of fluid pressure either to one operative end of said cylinder or to said pitch fining passing, a connection between the other operative end of said cylinder and said pitch coarsening passage, a mechanical connection between one of said valve parts and said piston whereby said valve part is rotated by movement of said piston, a mechanical connection between the other of said valve parts and the throttle whereby movement of the latter will rotate the said other of said valve parts, such that when the throttle-actuated valve part is moved from the neutral position said piston will be operated by the pressure difference applied to it to effect a follow up movement of the piston-connected valve part to return the valve to the neutral position, and a means movable responsively to the indicated air speed, said indicated air speed responsive means incorporated in said second-mentioned mechanical connection such that, for a given throttle movement, the movement of said other of said valve parts by said throttle will be reduced due to the movement of said indicated air speed responsive means to effect a smaller change of pitch at a high indicated air speed than at a lower indicated air speed.

3. A throttle-controlled, propeller-driving, gas turbine engine, for an aircraft, including a pitch-change mechanism connected to vary the pitch of a variable pitch propeller, pitch coarsening and fining passages connected with said mechanism, a valve through which operating fluid under pressure can be selectively supplied to said passages, said valve connected to be movable by a governor mechanism for selecting the passage to be supplied, and additional means which is connected to be actuated by the throttle and which selectively supplies fluid under pressure directly to said passages in a position intermediate said mechanism and said valve in such a manner that the propeller will very quickly absorb the change in the power developed by the engine resulting from movement of the throttle while keeping the engine speed at a constant predetermined value, at which latter it is always maintained by said governor mechanism for any setting of the throttle within the normal operating power range of the engine, said additional means including for the purpose a metering device having a cylinder with a sliding and rolling piston therein, a valve with two relatively rotatable parts for selectively controlling the connection of a source of fluid pressure either to one operative end of said cylinder or to said pitch fining passage, a connection between the other operative end of said cylinder and said pitch coarsening passage, a mechanical connection between one of said valve parts and said piston whereby said valve part is rotated by movement of said piston, a mechanical connection between the other of said valve parts and the throttle whereby movement of the latter will rotate the said other of said valve parts, such that when the throttle-actuated valve part is moved from the neutral position said piston will be operated by the pressure difference applied to it to effect a follow up movement of the piston-connected valve part to return the valve to the neutral position, a means movable responsively to the indicated air speed, a pivot positionable thereby, and a second pivot, linked to said first-mentioned pivot, incorporated in said second-mentioned mechanical connection such that, for a given throttle movement, a smaller change of pitch will be effected at a high indicated air speed than at a lower indicated air speed.

References Cited in the file of this patent

UNITED STATES PATENTS

| | | |
|---|---|---|
| 2,217,364 | Halford et al. | Oct. 8, 1940 |
| 2,423,191 | Kopp | July 1, 1947 |